UNITED STATES PATENT OFFICE.

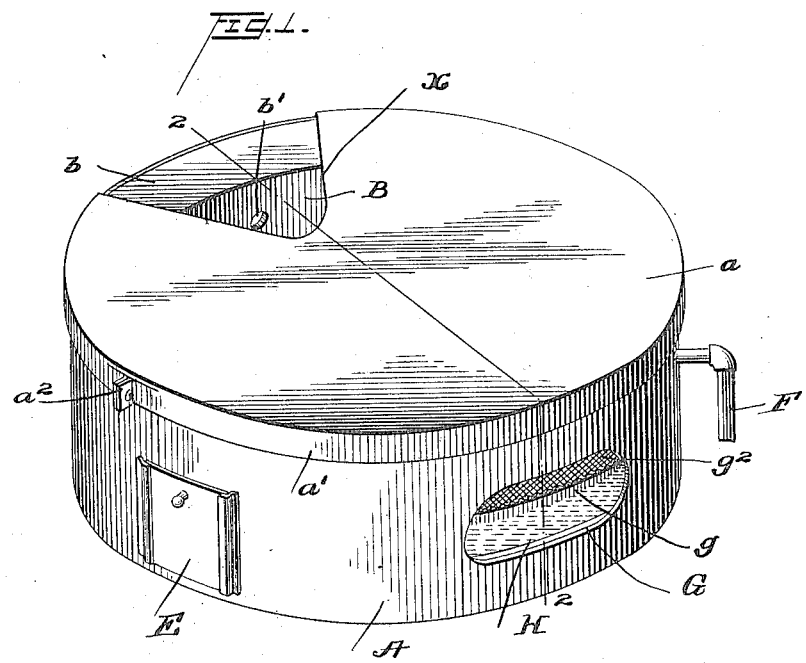
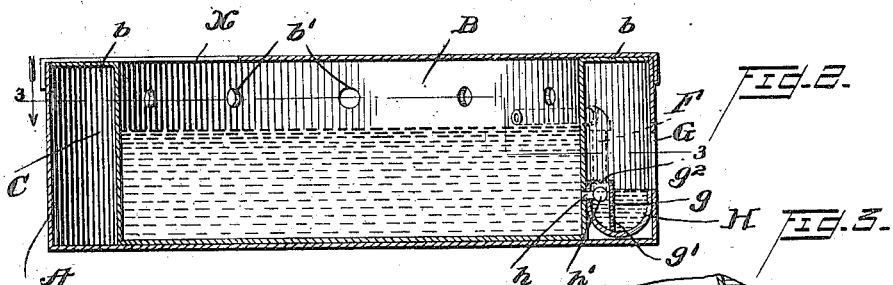
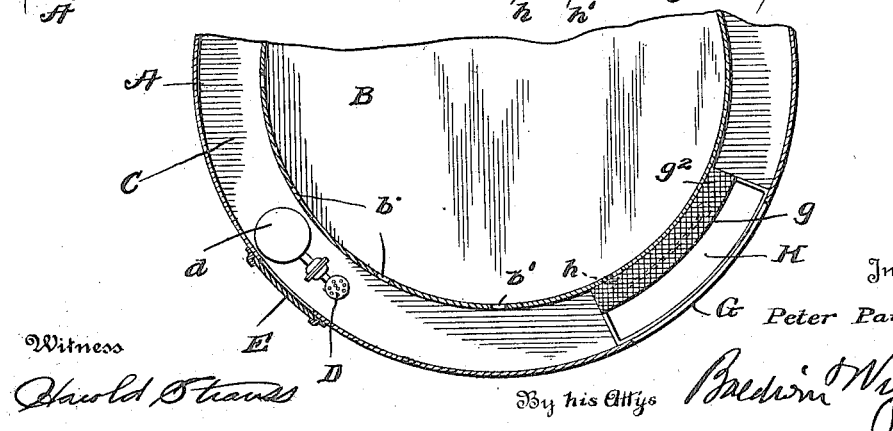

PETER PAULSEN, OF UTE, IOWA.

STOCK-WATERER.

1,213,897.

Specification of Letters Patent.  Patented Jan. 30, 1917.

Application filed June 30, 1916. Serial No. 106,788.

*To all whom it may concern:*

Be it known that I, PETER PAULSEN, a citizen of the United States, residing in Ute, in the county of Crawford and State of Iowa, have invented certain new and useful Improvements in Stock-Waterers, of which the following is a specification.

This invention relates to that class of waterers for cattle and poultry in which provision is made for preventing the water from freezing, and the object of my invention is to provide improved apparatus by means of which in a simple way the water is more thoroughly and uniformly heated, the formation of ice is prevented and the water may be easily reached by either large or small animals.

In carrying out my invention I provide a tank for containing water which is surrounded by an air chamber, provided with means for heating the air therein. Communication is established between this air chamber and the upper portion of the tank above the water. Heat is thus transmitted through the walls of the tank to the water therein and is also conveyed to the tank above the water. In this way I am enabled to employ a heater of small size and obtain a uniform distribution of the heat and hence it is not necessary to heat any one part of the tank to a high degree because the distribution of a comparatively low degree of heat to all parts of the tank prevents the freezing of the water therein at all times.

In the accompanying drawings:—Figure 1 is a perspective view of a stock waterer embodying my improvements. Fig. 2 shows a vertical section on the line 2—2 of Fig. 1. Fig. 3 shows a horizontal section on the line 3—3 of Fig. 2.

Preferably the stock waterer as a whole is of general cylindrical form. The outer casing A may be made of metal or other suitable material and within this outer casing is arranged a water tank B which is also cylindrical and of considerably less diameter than the casing A, thus leaving an annular air space C between the vertical walls of the casing and the vertical walls of the tank. The bottom of the tank rests on the bottom of the casing and at its upper end the tank is provided with an outwardly projecting annular flange $b$ which extends from the upper edge of the tank to the side walls of the casing, as clearly indicated in Fig. 2. The vertical walls of the tank are provided above the water level with openings $b'$ whereby communication is established between the annular air chamber C and the interior of the tank B. A heater D of any suitable construction supplied by a reservoir $d$ is mounted within the air space C, in the manner indicated in Fig. 3, preferably opposite a door E through which access may be had to the heater. The casing A is provided with a removable top $a$ having a flange $a'$ provided with suitable clamping devices $a^2$ by means of which the cover may be tightly fixed on the casing. Said cover is provided with an opening $x$ through which access is obtained to the water in the tank by cattle or larger animals. The tank is provided with an overflow pipe F which prevents the water level from rising too high in the tank, and an opening G is formed in the side of the tank through which access may be had by smaller animals to a trough H which is supplied with water through a pipe $h$, controlled by a float valve $h'$. By these devices the water may be maintained at the desired level in the trough H and access to the trough is readily obtained through the opening G, as before explained. In order to protect the float valve the trough is provided with a vertical partition $g$ which has an opening $g'$ to permit the passage of water to the front portion of the trough, and the float valve may be further protected by a screen $g^2$, as shown. Water may be supplied to the tank in any suitable way, either by a pipe or by filling it through the opening $x$. The water level is maintained in the manner before described.

The burner D heats the air in the annular air chamber which completely surrounds the body of water in the tank. Some of this heated air passes through the openings $b'$ into the tank B and assists in heating the body of water thereby acting upon the surface thereof before passing out through the opening $x$. Said heated air also acts directly upon the water in the trough H inasmuch as said trough is within the annular chamber which is heated in the manner before described.

It will be observed that my stock waterer is so constructed that there is but little evaporation in warm weather and the water is kept warm when the temperature is low.

The tank is of sufficient size to contain a large body of water which is readily accessible to horses and cattle, while provision is made for watering small animals which cannot so readily reach the water in the main tank.

I claim as my invention:

1. A stock waterer, comprising a water tank, a casing surrounding it and having an air chamber interposed between the casing and the tank which communicates with the interior of the tank above the water level therein through a plurality of openings located at different points in the water tank, a cover having a drinking opening resting on the tank and casing, a drinking trough located wholly within said air chamber, a valved pipe leading from the water tank to the trough, a vertical partition in the trough in front of said valve for protecting it, and a screen extending from said partition to the side of the tank above the valve for shielding the latter.

2. A stock waterer, comprising a water tank formed with a horizontally projecting annular flange, a casing surrounding the water chamber and provided with an air chamber below said annular flange, a heater in said chamber, means for conveying heated air from the chamber to the interior of the tank above the water level therein, and a cover for the tank which overlaps said annular flange but which is provided with an opening for access to the interior of the tank.

In testimony whereof, I have hereunto subscribed my name.

PETER PAULSEN.

Witnesses:
P. F. FIENE,
P. H. IRVEN.

Copies of this patent may be obtained for five cents each, by addressing the "Commissioner of Patents, Washington, D. C."